June 18, 1968  R. CREHORE  3,388,944
PANEL CAB FOR VEHICLES
Filed Oct. 23, 1965  6 Sheets-Sheet 3
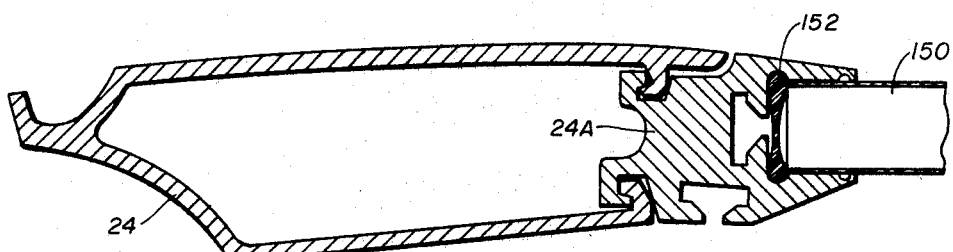
Fig. 6.
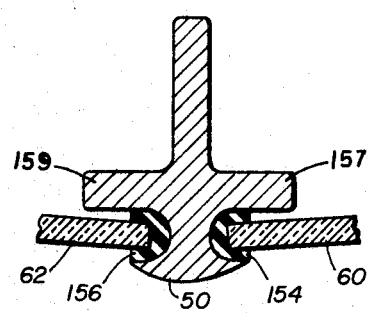
Fig. 7.
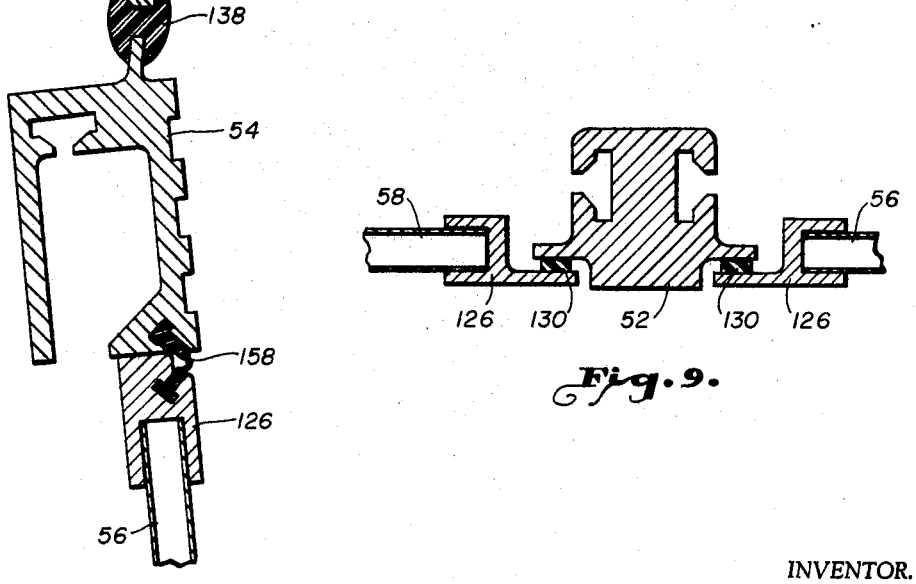
Fig. 8.
Fig. 9.
INVENTOR.
ROBERT CREHORE
BY
Head & Johnson
ATTORNEYS

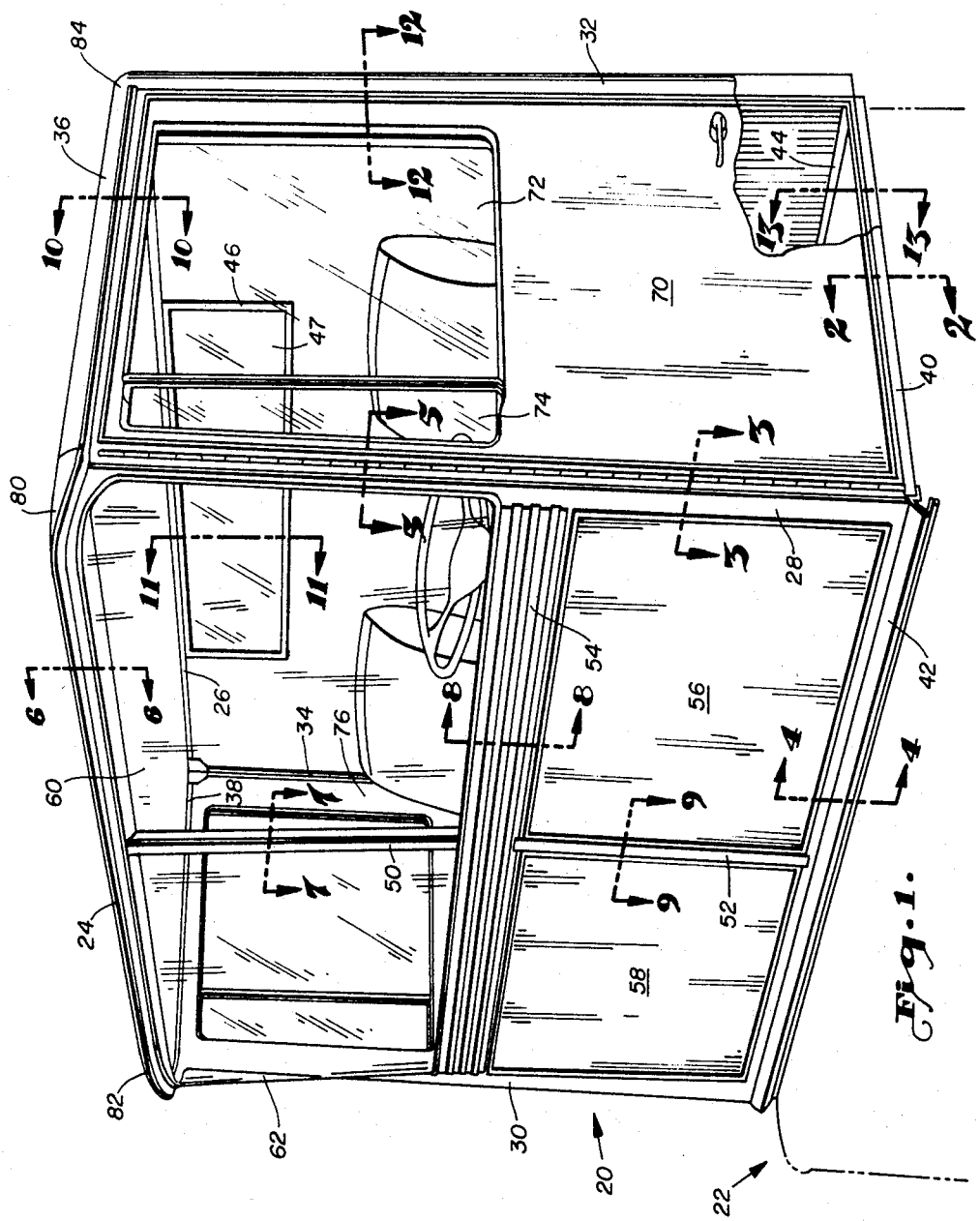

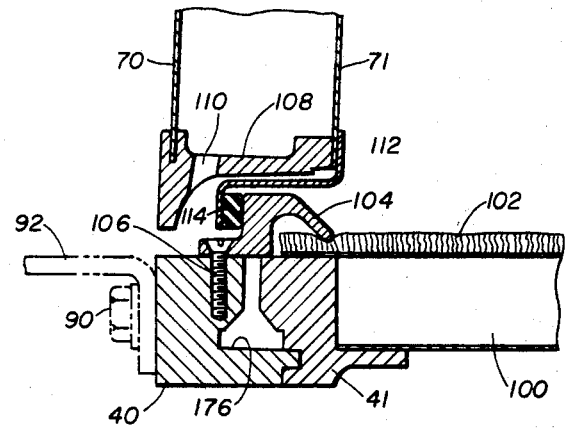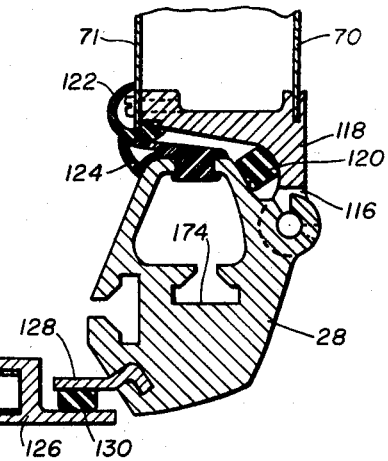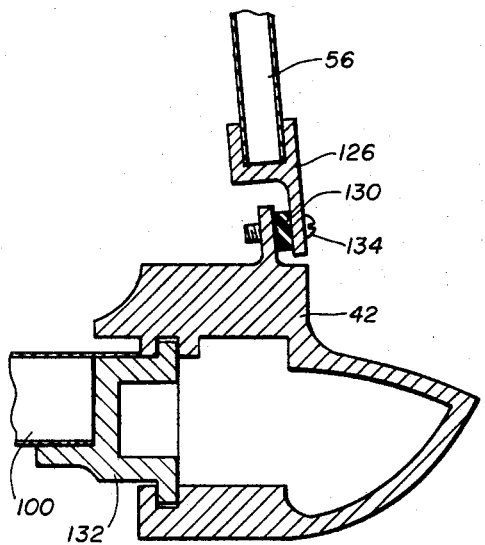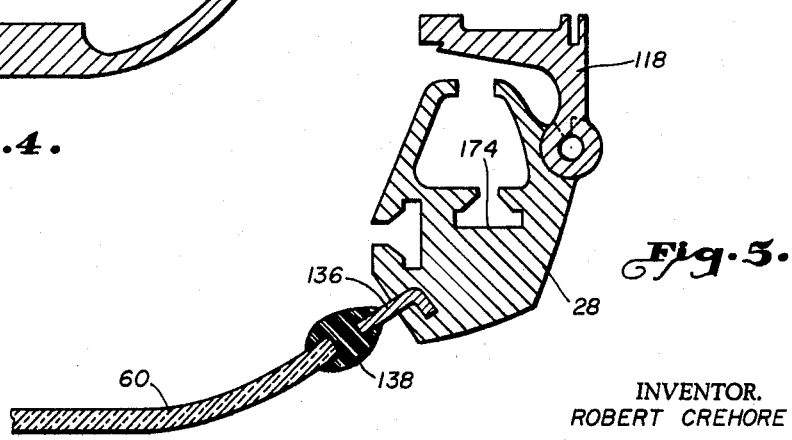

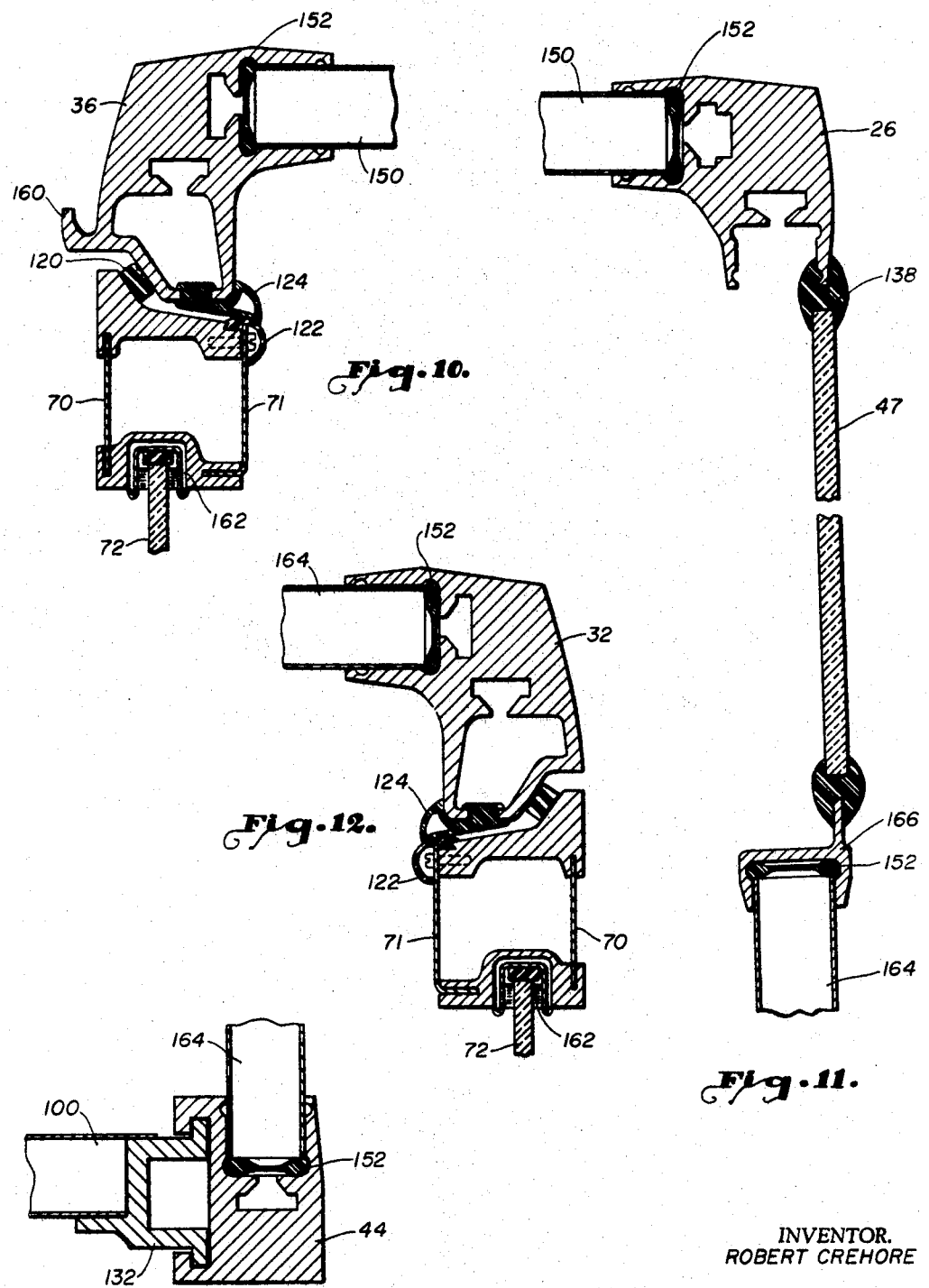

June 18, 1968 R. CREHORE 3,388,944
PANEL CAB FOR VEHICLES
Filed Oct. 23, 1965 6 Sheets-Sheet 5
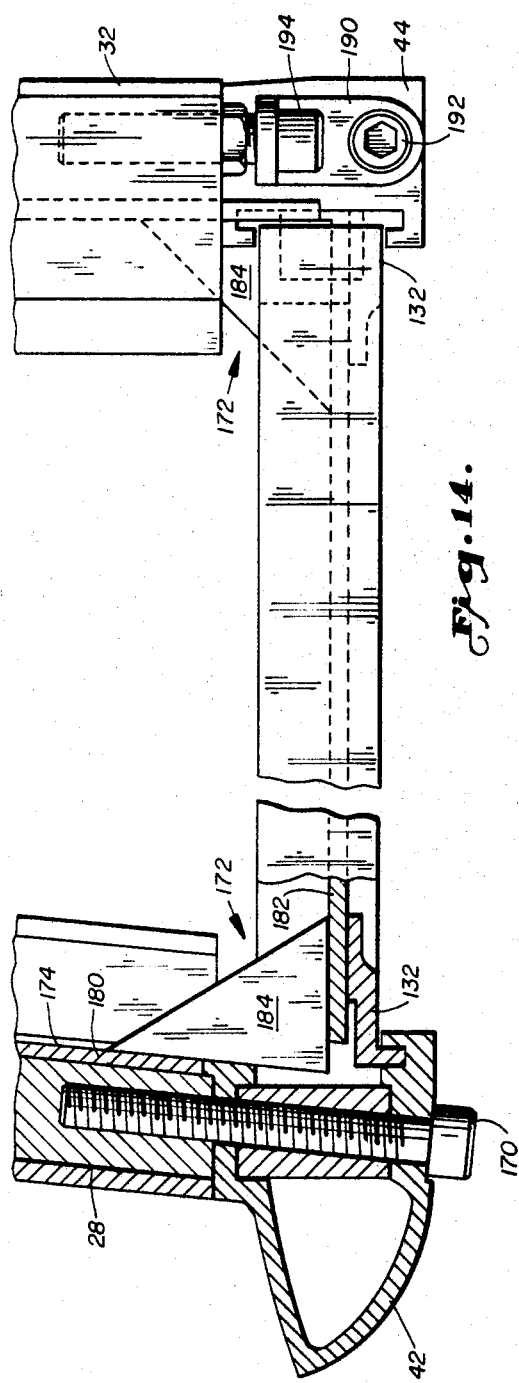
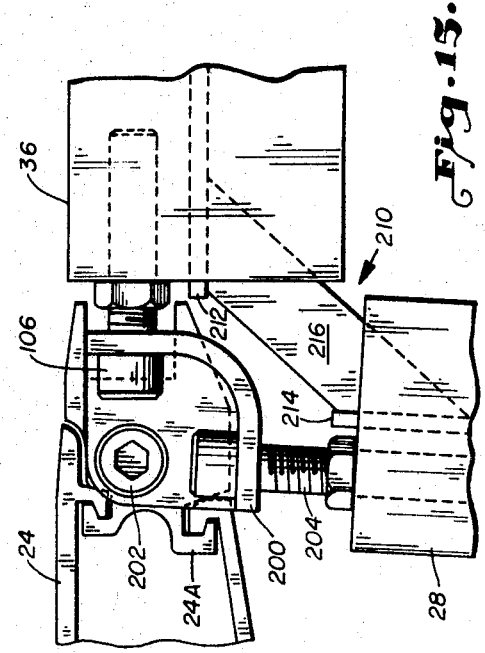
INVENTOR.
ROBERT CREHORE
BY
Head & Johnson
ATTORNEYS

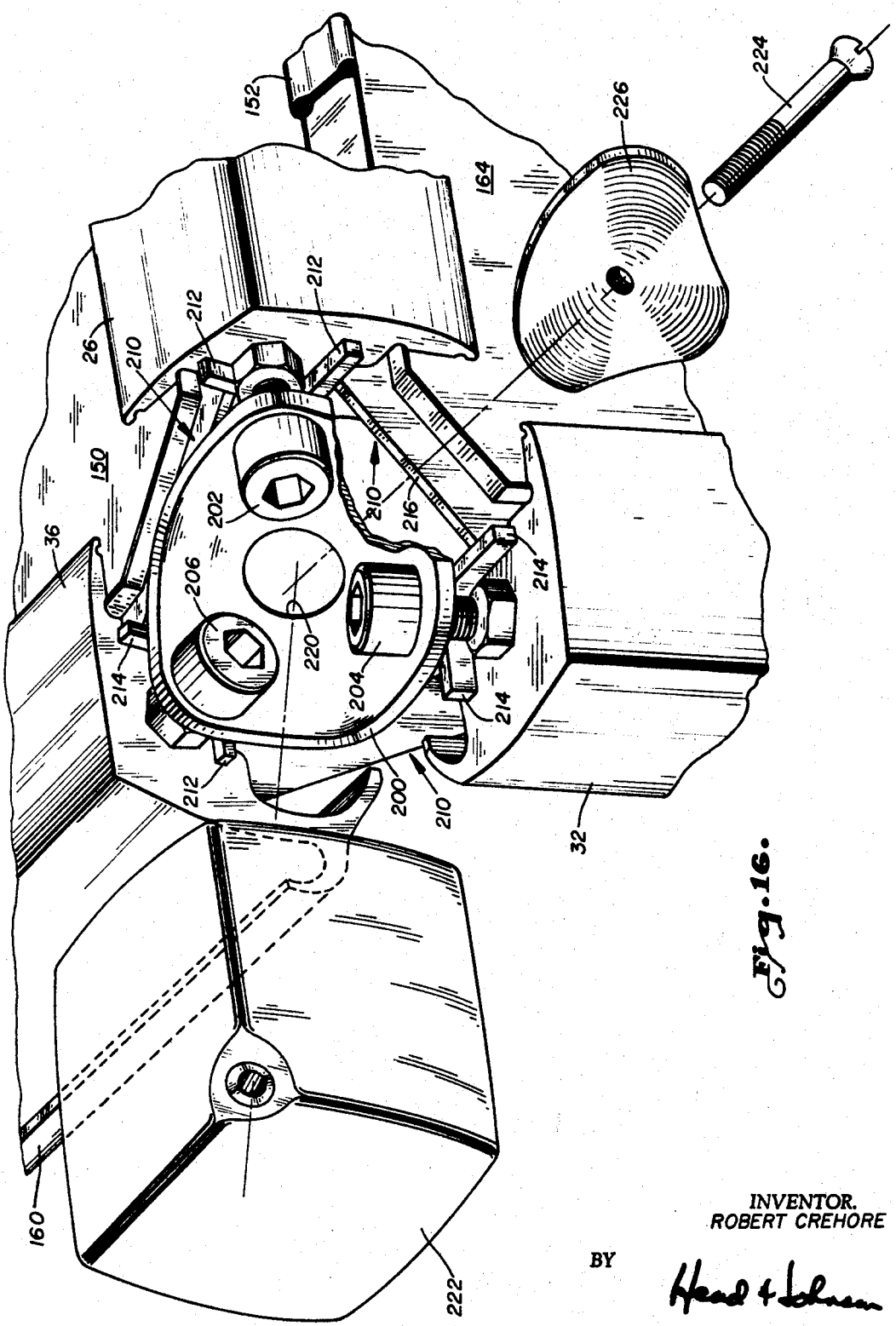

United States Patent Office 3,388,944
Patented June 18, 1968

3,388,944
PANEL CAB FOR VEHICLES
Robert Crehore, Tulsa, Okla., assignor to CCI Corporation, Tulsa, Okla., a corporation of Delaware
Filed Oct. 23, 1965, Ser. No. 504,013
5 Claims. (Cl. 296—28)

ABSTRACT OF THE DISCLOSURE

A panel cab structure for vehicles includes planar panel member which are stress loaded, without being mechanically fastened, by interconnection with extrusion type framing members which are retained and drawn together in tension at the corners thereof.

---

This invention relates to a panel cab for vehicles, particularly trucks and the like. More particularly, this invention relates to a combined extrusion and prestressed panel cab structural enclosure.

It is a primary object of this invention to provide a stressed extrusion frame and panel body or cab for vehicles such as trucks or the like. As such, it is an object to provide a cab construction that eliminates compound curves or shapes which normally require expensive and heavy duty die forming equipment, presses and the like.

Another object of this invention is to provide a compressively stressed loaded panel structure for truck cab bodies and the like which is adapted to achieve light weight strength characteristics for greater resistance to the normal forces encountered, such as wind and load conditions during operation and use.

It is another object of this invention to provide a compressively stressed loaded panel structure which utilizes extrusion members for its basic framework in which tolerances can be easily controlled as against the use of stamped or cast members.

A further object of this invention is to provide a compressively stressed loaded structure (panel cab) in which relatively planar panel members are stress loaded, without being mechanically fastened, by means of interconnection of extrusion type framing members at the corners thereof.

These and other objects of the invention will become readily apparent upon further reading of the specification and claims when taken in conjunction with the following illustrations of which:

FIGURE 1 is a perspective view of a cab construction according to this invention for use with a truck chassis.

FIGURES 2 through 13 are partial sectional views taken along the respective numerically corresponding lines as shown in FIGURE 1.

FIGURE 14 is an elevational view, partly cut away and in section, depicting the structural details of the lower left side of the panel cab structure of FIGURE 1.

FIGURE 15 is a top partial elevational view depicting the interconnection of the extrusion and panel members showing the upper left hand corner thereof.

FIGURE 16 is a perspective view showing a typical cab corner construction and connection, in this particular instance the upper left rear corner of the panel cab as shown in FIGURE 1.

Generally and broadly this invention describes a structural panel system including a supporting skeleton frame disposed in a single plane with structural stress resistant panel members substantially filling the space between said frame members, and means to connect the skeleton frame members together so as to compressively stress said panel members. Such panel systems are further interconnected to form other structural cubic members such as a panel cab for vehicles, trucks and the like. The system includes means for necessary windows, doors, etc., as required. The frame members and substantially all other secondary frame members are preferably pre-designed aluminum extrusions. The basic panel members are typically of the type commonly referred to as "sandwich panels" having parallel outer metallic skin members between which are filled structural honeycomb materials (axis of their openings perpendicular to the skin members) or high strength synthetic resins or set synthetic resin foams.

Referring now to the drawings, and in particular FIGURE 1, the numeral 20 is used to generally designate the panel cab construction of this invention in combination with the basic truck chassis generally designated by the numeral 22. The panel cab comprises a framework of basic extrusion members identified as follows:

24A: top front,
26: top rear,
28: left front vertical,
30: right front vertical,
32: left rear vertical,
34: right rear vertical,
36: top left,
38: top right,
40: bottom left,
42: bottom front, and
44: bottom rear.

Other secondary frame extrusions for the particular design as shown in FIGURE 1 include:

46: rear window frame,
50: front windshield divider,
52: front panel divider, and
54: front horizontal windshield and panel divider.

Integral with the framing members are front panel members 56 and 58 which are hingeably connected as hereinafter described to the front horizontal windshield and panel divider 54.

Windshield members 60 and 62 form the remaining portions of the front extrusion framework.

The numeral 70 represents the left side door of the cab which generally includes window 72 and wing members 74. The right side door includes the same or similar parts therefor. Front corner covering caps 80 and 82 are adapted to fill the gap between the framing extrusion members at the corner. Similarly, a rear cover cap 84 and a similar cap utilized on the right rear side of the cab construction (not shown in this view) are used as a decorative cover.

Referring now to the several sectional views, and particularly to FIGURE 2, although the description of these views relates primarily to one-half of the panel cab of this invention, it is to be understood that like or similar construction and parts are to be utilized in the other half. In FIGURE 2, left bottom extrusion member 40 includes an additional extrusion member 41 which are held together by a plurality of longitudinally spaced bolts 90 which also retain a portion of the truck chassis thereto such as fender 92 which is shown in dotted line. Floor panel member 100 is adapted to be supported and secured by the framing extrusion members of the bottom sides, front and rear, and thus provide a supporting floor for the cap. Carpeting or other cover material 102 is adapted to be secured by a door sill member 104 which is secured to left bottom extrusion member 40 by a plurality of longitudinally spaced bolts 106 and thus provide a stop for door 70. The door is of typical construction comprising outer panel member 70 and inner panel member 71 with a space therebetween for typical door operating and window operating mechanisms normally associated therewith. The bottom extrusion member 108 is adapted to support the panels 70 and 71 and includes a plurality of drain openings 110. Door sill bumper 112 is also combined with the extrusion and panel members and includes a rubber seal strip 114.

Further details of the door construction are shown in FIGURE 3 depicting the door as vertically supported to left front vertical extrusion member 28 by a hinge connection 116 formed as a part of door frame extrusion member 118. A resilient seal member 120 can be attached to either the extrusion member 28 or to the door frame extrusion 118 and provide a seal therebetween. Gap closure member 122, which is attached to the door and cooperates to seal with mating part 124, is positioned as a part of the extrusion member 28 as shown. Both portions are preferably composed of a resilient material such as rubber or synthetic resin or like materials having resiliency and sealing qualities. A portion of front panel 56 is shown here including its extruded frame 126 which is adapted to be sealingly supported against back-up member 128 by rubber seal strip 130.

In FIGURE 4 the arrangement of the various extrusions are depicted as regards the front lower extrusion 42 relative to panel 56. Front floor support extrusion member 132 is adapted to slide in appropriate grooves of extrusion member 42 and provide vertical support to the floor panel 100. A threaded connection 134 is adapted to retain the front panel 56 and framing members 126 in a rigid sealed position. It is to be understood, however, that other forms of latching or quick release members may be utilized to release the front panel and frame members 126 which are hingeably supported as hereafter described in FIGURE 8.

FIGURE 5 is another view similar to FIGURE 3 to the left front vertical extrusion member with particular regard to the fastening of windshield 60. The windshield is retained thereto by a framing member 136 including a vinyl seal strip 138 which is adapted to seal, retain and secure the windshield and provide some shock absorbency thereto. The framing member 136 and the parts connected thereto will be designed in accordance with the desired windshield shape which in this instance tapers upwardly and forwardly with slight curvatures at the right and left sides respectively. It is to be understood, however, that other windshield designs can be incorporated with the basic structural framework of this invention and accordingly this disclosure is not to be limited to the design as shown.

In FIGURE 6 the top front extrusion member 24 is adapted as shown to support windshield framing seal 138 for windshield 60. The extrusion member 24 is provided to be interengaged, by sliding movement, with the basic framing extrusion member 24A for supporting top roof panel 150. A vinyl or other resilient type of panel sealer 152 is utilized in appropriate recesses of extrusion 24A which, when utilized in conjunction with the compressive forces applied to panel 150 as hereafter described, will provide a sufficient seal against weather conditions.

FIGURE 7 is descriptive of the front windshield divider member 50 which is adapted to retain windshield glass members 60 and 62, respectively, within resilient channels 154 and 156. Alternatively the window glass may be attached to the outward protrusions 157 and 159 using seals 138, shown elsewhere.

In FIGURE 8 the innerconnection of the windshield members in the bottom panel members are shown utilizing the front horizontal windshield and panel divider extrusion 54 which includes means adapted to receive the windshield framing seal member 138 for windshield 60. Panel 56, and its framing member 126, is hingeably supported along the top horizontal edge to the horizontal windshield and panel divider 54 by a polypropylene or substantially indestructable synthetic resin hinge 158 which extends along the longitudinal length of the panel and frame. The polypropylene hinge 158 is positioned within appropriate grooves and slots by sliding movement and is adapted to provide not only a hinge support for the panel members 56 but also a weather seal.

In FIGURE 9 the arrangement of parts as respects panels 56 and 58 are shown with respect to vertical extrusion member 52 to which they are sealingly supported.

FIGURE 10 shows the interconnection of the upper portion of door 70 relative to left top extrusion member 36, utilizing like parts with like numerals as heretofore described. The extrusion support member 36 includes a water run off channel 160 formed as a part thereof. Door window glass 72 is adapted to be moved upward or downward as desired utilizing mechanism, not shown herein, which is well known to men skilled in the art. Likewise, a typical window framing member 162 is shown in this view for providing appropriate seal from weather as is well known in the automotive arts.

FIGURE 11 is descriptive of the rear window framing members which are tied together with respect to top rear extrusion member 26, top panel 150 and rear panel 164. The rear window 147 is supported to the extrusion member 26 and window frame extrusion members 166 by appropriate vinyl seal designated by the numeral 138.

FIGURE 12 describes the relationship of rear panel 164 and left door 70 relative to extrusion frame member 32.

FIGURE 13 describes the relationship of rear panel 164, floor support panel 100, and support 132 relative to lower rear extrusion frame 44.

Referring now to FIGURE 14, the innerconnection of the various extrusion members making up the lower portion thereof are shown in partial cut away views. The gusset support members 172, which are used throughout the construction of the panel cab of this invention, include wing portions 180 and 182 which extend within a plane generally perpendicular to the innerconnecting rib 184 and hence provide corner strengthening support for the overall construction. The front bottom extrusion member 42 is bolted to left front vertical member 28 by bolt 170 after gusset support member wings have been positioned in groove 174 of extrusion 28 and groove 176 formed by the bolted members 40 and 41. The rear corner of the panel cab framing construction is supported by a washer 190 which interconnects rear bottom extrusion member 44 and left rear vertical member 32 by respective bolts 192 and 194. A similar washer means is adapted to interconnect left rear vertical extrusion member 32 and the left bottom member 40, but not shown here.

FIGURE 15 is illustrated here to describe the innerconnection of panels and extrusions at the top forward corner of the panel cab of this invention. Basic framing extrusions 24A, 28 and 36 are joined under tension by means of a paraboloid like washer member 200 which has appropriate openings therein to receive bolts 202, 204 and 206 which attach respectively to extrusions 24A, 28 and 36. Similar to that previously described, a gusset member 210 includes ribs 212 and 214 innerconnected by plate 216. In this instance the gusset 210 is adapted to provide rigidity between extrusions 28 and 36. A similar gusset strengthening member is provided between extrusion member 24A and 36 and likewise between extrusion members 24A and 28. This is shown similarly in FIGURE 16 which is a perspective view, partially cut away and exploded to show the interconnection of extrusions forming the upper rear corner of the panel cab of this invention. Similar to that shown in FIGURE 15, the connection between extrusion members 26, 32 and 36 is made by means of paraboloid washer 200 and bolts 202, 204 and 206, respectively. Likewise, rigid innerconnection and support of the corners is provided by the three gusset members 210 which include respective ribs 212 and 214 and innerconnecting plate 216. An opening 220 in the washer member 200 provides means by which cover cap 222 may be attached utilizing bolt 224 and washer 226.

The construction of the cab of this invention may be described in a variety of methods. Generally speaking, the floor members 40, 41 and 132 are positioned in place with panel 100. In some instances the construction may take place directly upon the vehicle chassis. The floor is perforated appropriately to permit operation of the vehicle operating mechanisms, steering, braking, etc. Each lower rear corner is assembled by interconnecting, for example, extrusions 32, 44 and 40-41 with gusset members 172 and fastening with washer 190 and bolts 192 and 194 as previously described. Thereafter panel 164, with or without rear window frame and glass, is positioned into the channel formed by extrusions 44, 32 and 34. Thereafter, gussets 210 are positioned to interconnect all extrusions, e.g. 36, 32 and 26 at one corner thereof, likewise at the corner on the other side. This construction continues until all of the basic framing panels and framing extrusions are in place after which the paraboloid washers are bolted in place and drawn tightly to compressively stress the interconnecting panels and thus form a rigid framework for the assembly of the remaining doors, glass, etc.

Although the invention has been described with reference to a cab for vehicles, it is to be understood that the invention includes other designs than that shown and specifically described heretofore. For example, many cabs include a sleeping area compartment at the rear of the cab. Additionally, many carriers desire or need only a cab compartment for a single operator, yet the construction methods taught herein are applicable to such compartments.

As used herein, and in the claims, a "cubical-like enclosure" is defined to encompass basically all six-sided structures, not necessarily where the sides are of equal squares and not necessarily where the framing members intersecting at a given corner are perpendicular to each other.

Having thus described the invention, what is claimed as new and desired to be secured by Letters Patent is:

1. An enclosure for vehicles comprising
    extrusion framing members defining the exterior edge corners of said enclosure to define top, bottom, rear and side planes thereof, said framing members including a slot adapted to slidably retain panel members for at least one of said top, bottom, rear and side planes,
    paraboloid shaped washers at each exterior corner formed by the intersection of said framing members,
    means, including threaded bolts from said washer into each of said framing members to draw each of said framing and said washer together whereby, when each of said corners is so drawn together, said framing members will be stressed in tension and said panel members stressed in compression.
2. An enclosure of claim 1 constructed for a panel operator control cab for vehicles including
    within said front panel member a resilient supported and sealed windshield window, and
    a door hingeably supported to fill and seal the space between said framing members defining at least one of said side planes.
3. An enclosure of claim 2 wherein said door and/or said side panel includes an openable window.
4. An enclosure of claim 3 wherein said rear panel includes a sealed rear window.
5. An enclosure according to claim 1 including a resilient seal strip between said panel members and said framing slot.

References Cited
UNITED STATES PATENTS

| | | | |
|---|---|---|---|
| 405,672 | 6/1889 | Kruse | 52—280 |
| 1,699,021 | 1/1929 | Reuter | 52—282 X |
| 2,206,693 | 6/1940 | Gehnrich | 52—280 |
| 2,489,670 | 11/1949 | Powell | 296—28.2 |
| 2,818,613 | 1/1958 | Peras. | |
| 2,838,592 | 1/1958 | Feketics | 52—282 X |
| 2,997,333 | 8/1961 | Kaufman et al. | 296—28 |
| 3,055,699 | 9/1962 | May | 296—28 |
| 3,138,398 | 6/1964 | Silvermann | 105—366 X |

BENJAMIN HERSH, *Primary Examiner.*

LEO FRIAGLIA, *Examiner.*

J. A. PEKAR, *Assistant Examiner.*